United States Patent [19]

van Koesveld et al.

[11] Patent Number: 4,604,550
[45] Date of Patent: Aug. 5, 1986

[54] DISPLAY TUBE WITH TERBIUM-ACTIVATED BLUE-LUMINESCING PHOSPHOR SCREEN

[75] Inventors: Jan L. van Koesveld; Roelof E. Schuil, both of Eindhoven, Netherlands

[73] Assignee: U.S. Philips Corporation, New York, N.Y.

[21] Appl. No.: 667,043

[22] Filed: Nov. 1, 1984

[30] Foreign Application Priority Data

Nov. 3, 1983 [NL] Netherlands .................. 8303782

[51] Int. Cl.⁴ ................ H01J 31/00; H01J 29/10; C09K 11/08
[52] U.S. Cl. .................... 313/478; 313/468; 313/474; 358/253; 252/301.4 S; 252/301.4 H
[58] Field of Search .................. 313/468, 474, 478; 358/250, 253; 252/301.4 S, 301.4 H

[56] References Cited

U.S. PATENT DOCUMENTS

| | | | |
|---|---|---|---|
| 3,760,215 | 9/1973 | Sach | 313/92 R |
| 3,946,267 | 3/1976 | Lustig et al. | 313/473 |
| 4,177,399 | 12/1979 | Muccigrosso et al. | 313/368 |
| 4,275,333 | 6/1981 | Kagami et al. | 313/495 |
| 4,307,320 | 12/1981 | Kotera et al. | 313/474 |

Primary Examiner—Davis L. Willis
Assistant Examiner—William L. Oen
Attorney, Agent, or Firm—Norman N. Spain

[57] ABSTRACT

A display tube comprising in an evacuated envelope means to generate at least one electron beam which is focused on a display screen and describes a field thereon, which display screen comprises a terbium-activated blue-luminescing phosphor on a carrier, and in which the light emitted by the phosphor falls through a filter. If the energy of the emissions of the phosphor which find their origin in the $^5D_3$-level of terbium is at least 40% of the energy of the emissions of all terbium levels and the filter has a transmission of more than 75% at those wavelengths where the $^5D_3 \rightarrow ^7F_5$ and the $^5D_3 \rightarrow ^7F_4$ emissions of terbium are located and the filter has a transmission of less than 10% at those wavelengths where the $^5D_4 \rightarrow ^7F_5$ and the $^5D_4 \rightarrow ^7F_4$ and the $^5D_4 \rightarrow ^7F_3$ emissions of terbium are located so that the color point of the filtered light is located in the range $x \leq 0.200$ and $y \leq 0.100$ in the CIE color triangle, a well saturated blue picture is displayed having a satisfactorily high energy efficiency.

8 Claims, 11 Drawing Figures

DISPLAY TUBE WITH TERBIUM-ACTIVATED BLUE-LUMINESCING PHOSPHOR SCREEN

BACKGROUND OF THE INVENTION

The invention relates to a display tube comprising in an evacuated envelope means to generate at least one electron beam which is focused on a display screen and describes a field thereon, which display screen comprises a terbium-activated phosphor on a carrier, and in which the light emitted by the phosphor passes through a filter.

DESCRIPTION OF THE PRIOR ART

Said display tube may be, for example, a monochrome or multicolour display tube, a projection television display tube, a so-called D.G.D.-tube (D.G.D=Data Graphic Display) or an oscilloscope tube. In most of the cases the carrier forming part of the display screen is also a light-transmitting window in the envelope of the display tube. In display tubes for projection television, the carrier may alternatively be non-light-transmitting and be provided with cooling means. In that case the light emanates on that side of the display screen on which the electron beam is incident and is projected outside the device via a system of mirrors through a window in the tube envelope. A display tube of the kind described in the opening paragraph is known from U.S. Pat. No. 4,177,399 which describes a display screen which comprises a green-emitting, terbium-activated gadolinium-oxysulphide. A filter of green filter glass which passes a narrow band of the spectrum adapted to the emission of the green phosphor is provided on the display window of the tube. As a result of this the transmission of the green picture is optimized, while substantially no ambient light is transmitted so that a better contrast is obtained.

For displaying a blue-colored picture, the blue-emitting, silver-activated zinc sulphide (ZnS:Ag) has so far often been used. Although said phosphor has a high energy efficiency of approximately 20%, it shows a strong saturation when the current density is increased. At very high current densities the energy efficiency is smaller than 4%. As a result of this said blue phosphor is less suitable for use in projection television display tubes. A number of alternative blue phosphors, for example, thulium (Tm)-activated and terbium (Tb)-activated phosphors, have the disadvantage that the energy efficiency at high current densities is too low and/or the color point is not good. Terbium-activated blue luminescing phosphors, for example, terbium-activated yttrium oxysulphide ($Y_2O_2S$:Tb) and terbium-activated lanthanum oxybromide (LaOBr:Tb) have no good colour point, notably a very unsaturated color point.

Japanese Patent Application 58-38783 (Jap. Pat. Kokai), for example, discloses a terbium (Tb)-activated blue pigmented phosphor. The yttrium oxysulphide ($Y_2O_2S$) is activated with 0.001 to 0.2 mol.% of terbium (Tb) and coated with cobalt aluminate ($CoAC_2O_4$) as a blue pigment. With a pigment concentration up to 5% by weight a small color improvement occurs, in which the x and y-values in the CIE color triangle remain larger than 0.200 and 0.180, respectively. With larger concentrations of more than 5% an undesired efficiency decrease occurs.

SUMMARY OF THE INVENTION

It is the object of the invention to provide a display tube with which it is possible, when using a terbium-activated phosphor, to display a well saturated blue picture having a satisfactorily high energy efficiency.

According to the invention, a display tube of the kind mentioned in the opening paragraph is characterized in that the energy of the emissions of the phosphor which find their origin in the $^5D_3$-level of terbium, is at least 40% of the energy of the emissions of all terbium levels and the filter has a transmission of more than 75% at those wavelengths where the $^5D_3 \rightarrow {}^7F_5$ and the $^5D_3 \rightarrow {}^7F_5$ and the $^5D_4 \rightarrow {}^7F_4$ and the $^5D_4 \rightarrow {}^7F_3$ emissions of terbium are located, so that the color point of the filtered light is situated in the range $x \leq 0.200$ and $y \leq 0.100$ in the CIE colour triangle. As a result of the good saturation behaviour of the terbium-activated blue-luminescing phosphors, the tube has a better efficiency than the so far known tubes having blue-luminescing phosphors. The wide terbium spectrum provides the possibility of improving the colour point by means of a filter. In addition, the ratio of the $^5D_3$ and $^5D_4$ emissions of terbium depends mainly on the concentration of terbium and to a smaller extent on the nature of the lattice of the phosphor. By choosing the phosphor in combination with a filter as has been indicated, it is possible to vary the spectrum of a terbium-activated phosphor by means of the filter in such manner that a saturated blue colour is obtained without the efficiency decreasing too much. The energy efficiency of the combination of the phosphor and filter is approximately 6 to 12% and the phosphor is more linear as compared with ZnS:Ag. This latter improvement means that that there is also a higher efficiency at higher current densities, as compared with ZnS:Ag.

The filter may be placed anywhere in the light path between the emitting phosphor and the viewer. For example, it may be provided in the form of a layer between the phosphor and a transparent carrier. It is also possible to place the filter on the outside against or in front of the display window. Another possibility is to provide the filter in the form of a layer around the phosphor grain, or as pigmenting grains on the phosphor grains.

A first preferred embodiment of the display tube in accordance with the invention which exhibits a good blue colour and a high energy efficiency is characterized in that the terbium-activated phosphor is a phosphor on the basis of LnOX, wherein Ln is one or more of the elements selected from the group consisting of gadolinium (Gd), Lutetium (Lu), yttrium (Y) and lanthanum (La) and X is one or more of the elements selected from the group consisting of fluorine (F), chlorine (Cl), bromine (Br), and iodine (I). Particularly suitable is a phosphor on the basis of lanthanum oxybromide (LaOBr), in which the terbium concentration is between 0.07 and 2 mol% with respect to lanthanum. Said phosphor has a very linear character. It is, of course, possible to replace a small part of the lanthanum by one or more substances selected from the group consisting of yttrium (Y), gadolinium (Gd) and lutetium (Lu), and a small part of the bromine (Br) by one or more substances selected from the group consisting of chlorine (Cl), fluorine (F) and iodine (I).

Another embodiment of a display tube in accordance with the invention also having a good colour and a sufficiently high energy efficiency is characterized in that the terbium-activated phosphor is a phosphor on the basis of yttrium oxysulphine ($Y_2O_2S$) and the terbium (Tb) concentration is between 0.05 and 1 mol% with respect to yttrium (Y). It is, of course, also possible to replace a small part of the yttrium (Y) by one or more substances selected from the group consisting of lanthanum (La), gadolinium (Gd) and lutetium (Lu).

The transmission of the filter is preferably characterized in that the filter has a transmission of more than 75% for light having a wavelength between 410 and 420 nm and between 435 and 445 nm, the transmission of the filter decreases between 445 and 530 nm to smaller than 15% at 530 nm, and the filter has a transmission for less than 10% between 540 and 560 nm, between 580 and 600 nm and between 610 and 630 nm. If in addition the transmission of the filter decreases between 445 and 530 nm to smaller than 10% at 530 nm, a deeper blue colour is obtained, with lower x and y values in the C.I.E. colour triangle. If in addition the filter has a transmission of less than 5% between 540 and 560 nm, a still deeper blue colour is obtained.

BRIEF DESCRIPTION OF THE DRAWINGS

The invention will now be described in greater detail, by way of example, with reference to a drawing, in which.

DESCRIPTION OF THE PREFERRED EMBODIMENTS

Figure 1:
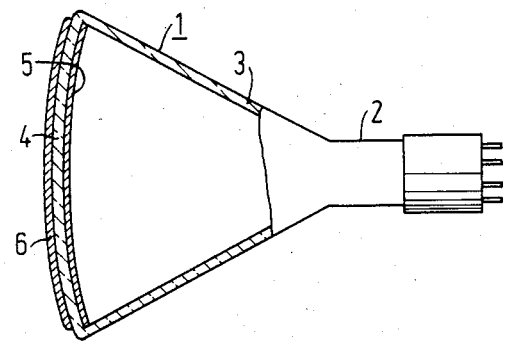
FIG. 1 is a diagrammatic longitudinal sectional view of a display tube according to the invention.
Figure 5:
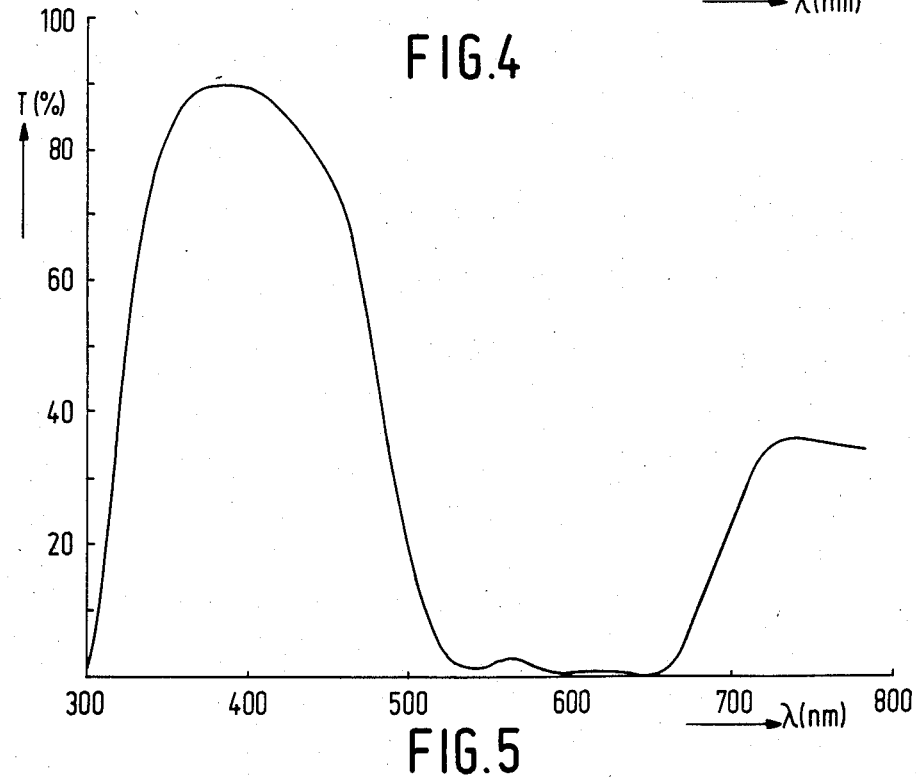
FIG. 5 shows the transmission characteristic of a first filter for a display tube according to the invention.

FIG. 1 is a diagrammatic longitudinal sectional view of a display tube according to the invention. This tube comprises an evacuated envelope 1 having a neck 2, a cone 3 and a display window 4. The display window 4 comprises on its inside a display screen 5 having a terbium-activated phosphor. The terbium concentration has been chosen to be so that the energy of the emissions which find their origin in the $^5D_3$-level of terbium is at least 40% of the energy of the emissions of all terbium levels. With a lower percentage the phosphor, due to the too low efficiency, is of less importance for use as a blue phosphor. A filter 6 having a transmission characteristic as shown in FIG. 5 is provided on the outside of the display window. Very useful are some filters of Messrs. Schott, for example, the types BG25 and 37.

Figure 2A:
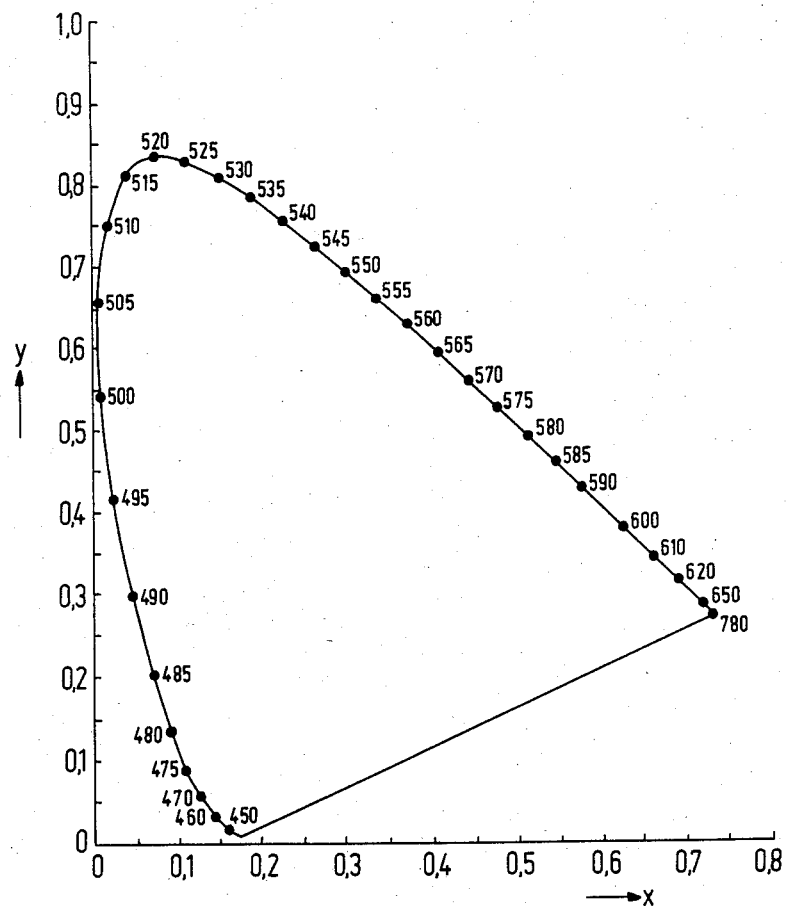
FIG. 2a shows a CIE color triangle.
Figure 2B:
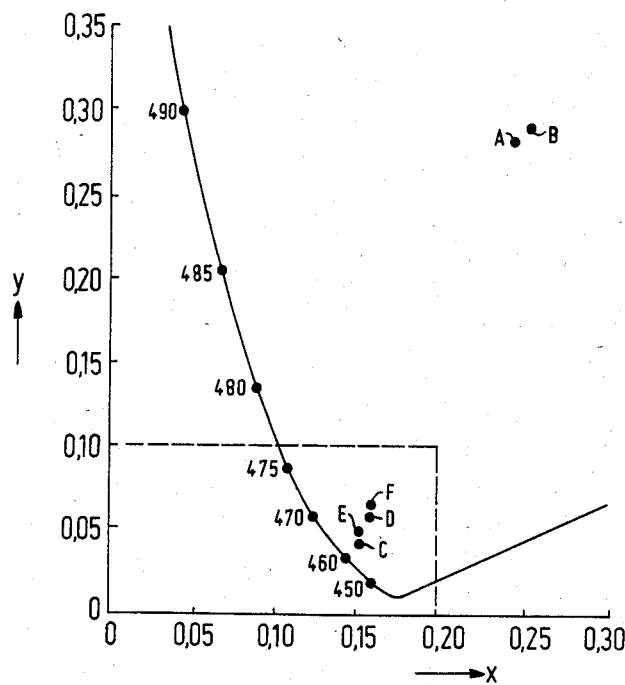
FIG. 2b shows a detail of said triangle.

FIG. 2a shows the CIE color triangle. FIG. 2b shows a part of said triangle in which the color points A and B of two phosphors are shown and which will be explained with reference to FIGS. 3 and 4. The color points C, D, E and F of these phosphors in combination with the filters shown in FIGS. 5 and 6 are also shown within the area bounded by the broken line ($x \leq 0.2$, $y \leq 0.1$).

Figure 3:
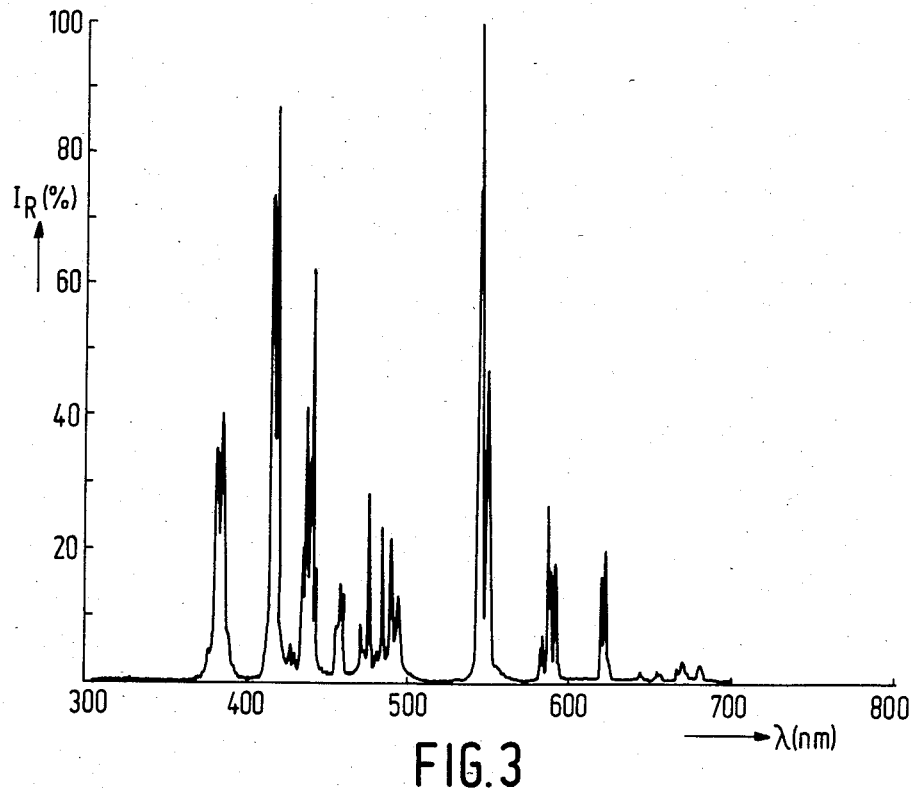
FIG. 3 shows the spectral energy distribution of a first phosphor for a display tube according to the invention.

FIG. 3 shows the spectral energy distribution of Tb-activated $Y_2O_2S$ which comprises 0.3 mol% Tb with respect to Y. The location of the energy levels of $Tb^{3+}$ is known inter alia from J.Chem.Phys. 38 (1963) p.2172. The intensity standardized at the value of the highest peak, the relative intensity $I_R$, is shown as a function of the wavelength. The x and y values of this phosphor in the CIE color triangle are 0.249 and 0.287, respectively. This is point A in FIG. 2b. The energy efficiency of this phosphor is larger than 13%.

Figure 4:
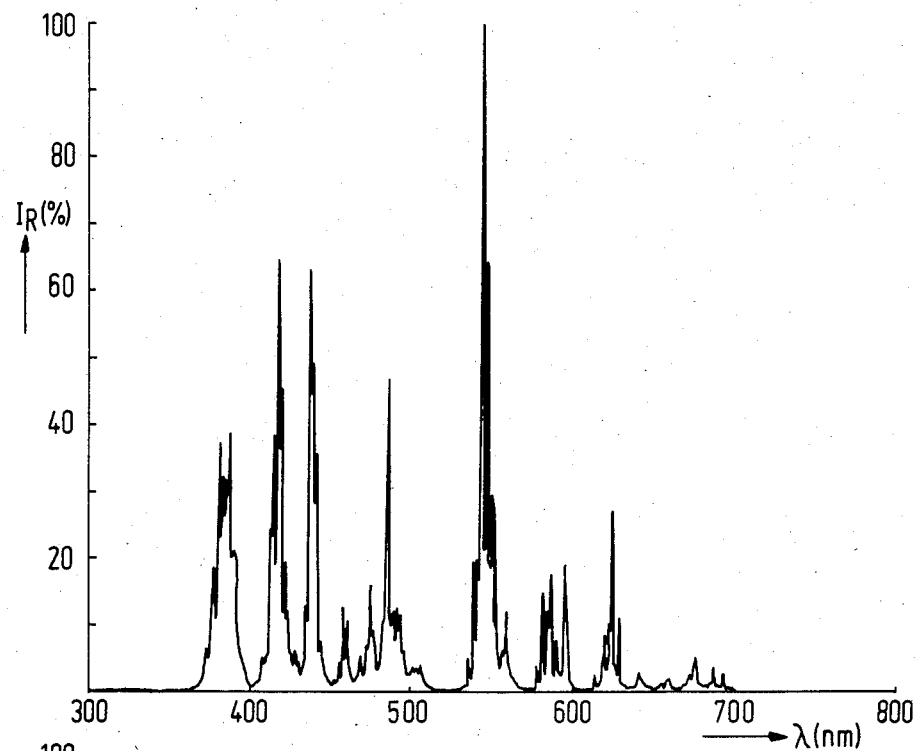
FIG. 4 shows the spectral energy distribution of a second phosphor for a display tube according to the invention.

FIG. 4 shows in an analogous manner the spectral energy distribution of Tb-activated LaOBr which comprises 0.5 mol% Tb with respect to La. The x and y values of this phosphor in the CIE color triangle are 0.255 and 0.290, respectively. This is point B in FIG. 2b. The energy efficiency of this phosphor is larger than 12%.

Figure 6:
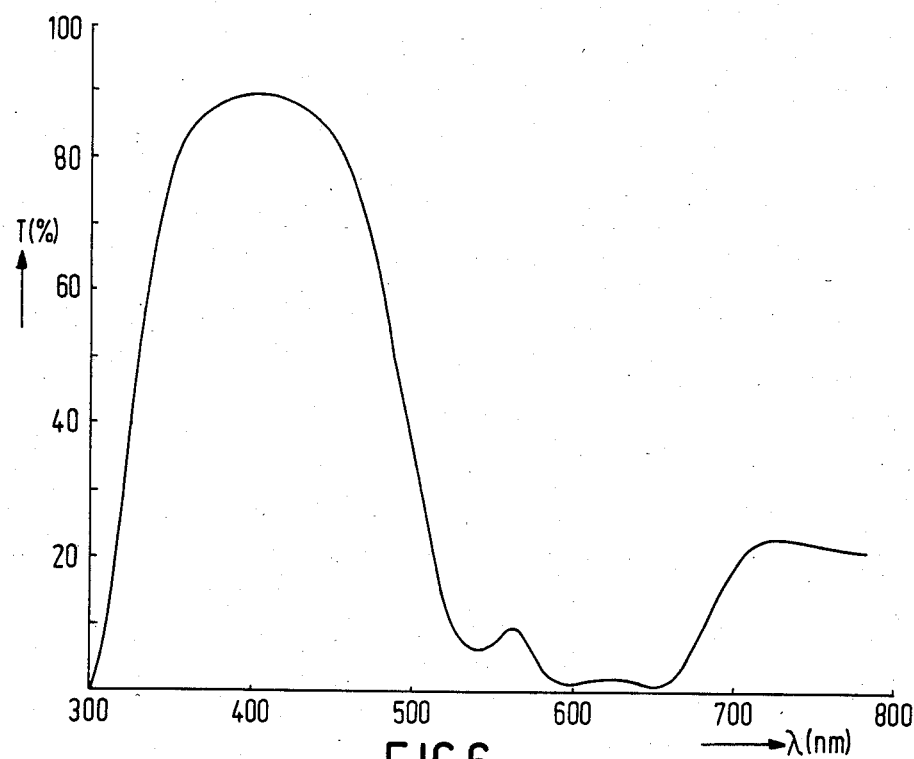
FIG. 6 shows the transmission characteristic of a second filter for a display tube according to the invention.

FIGS. 5 and 6 show the transmission characteristics of filters BG25 and BG37, respectively, of Messrs. Schott, which filters have a thickness of 1 mm. Said filters satisfy the requirements imposed. The transmission T (in %) is shown as a function of the wavelength.

Figure 7:
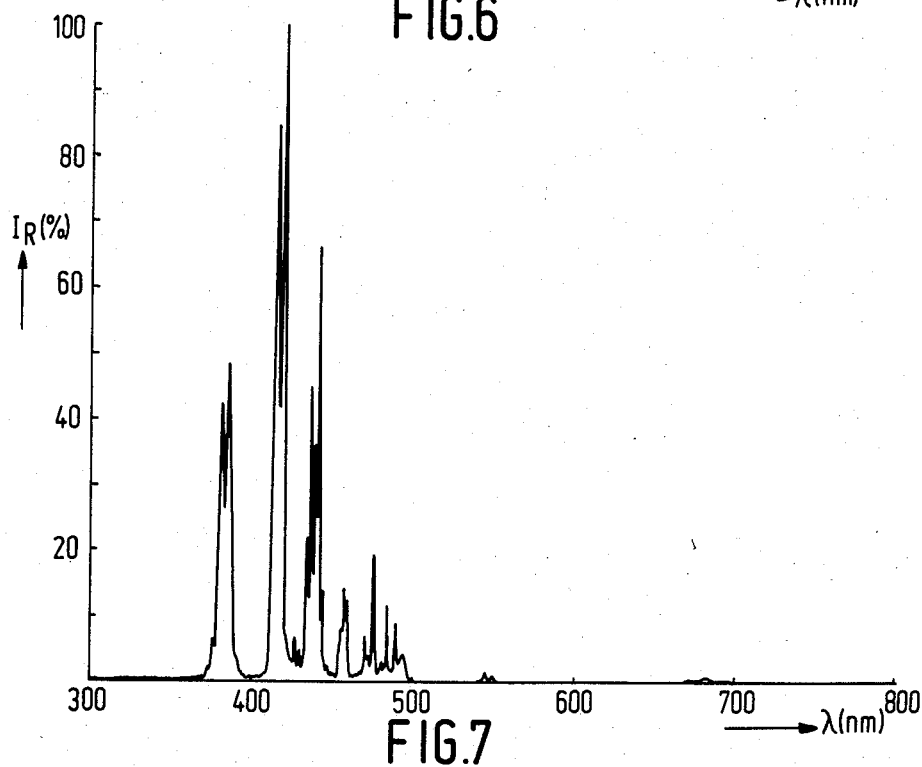
FIG. 7 shows a spectrum of the light of the phosphor the spectrum of which is shown in FIG. 3 after it has passed through a filter having a transmission characteristic according to FIG. 5.

FIG. 7 shows the spectral energy distribution which results after the light of the phosphor having the spectrum according to FIG. 3 has passed through a filter having the transmission characteristic according to FIG. 5. The x and y values associated with this filter-phosphor combination according to the invention are 0.157 and 0.035 respectively, hence this light is deep blue. This is point C in FIG. 2b. The energy efficiency of this combination is larger than 7.7%.

Figure 8:
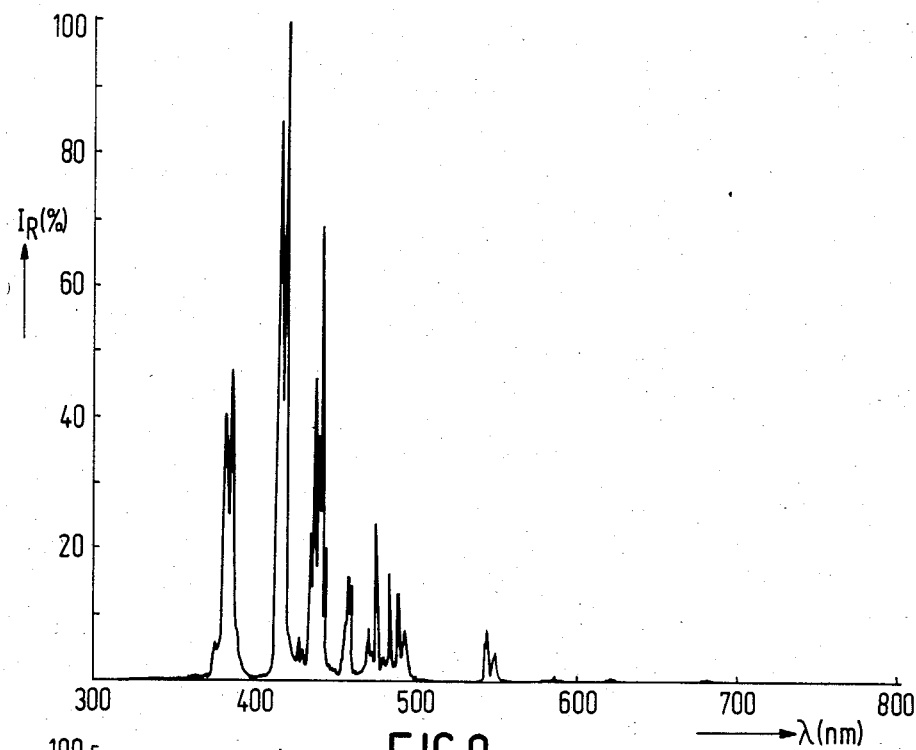
FIG. 8 shows a spectrum of the light of the phosphor the spectrum of which is shown in FIG. 3 after it has passed through a filter having a transmission characteristic according to FIG. 6.

FIG. 8 shows the spectral distribution which results after the light of the phosphor having the spectrum according to FIG. 3 has passed through a filter having the transmission characteristic shown in FIG. 6. The x and y values associated with this filter-phosphor combination are 0.161 and 0.065, respectively. This is point D in FIG. 2b. The energy efficiency of this combination is larger than 8.5%.

Figure 9:
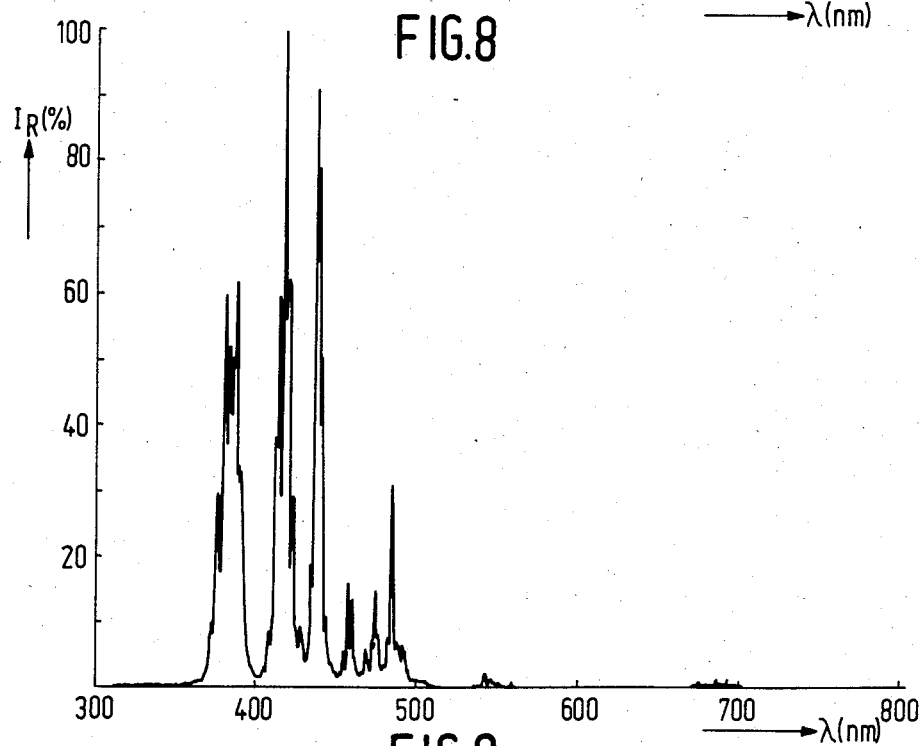
FIG. 9 shows a spectrum of the light of the phosphor the spectrum of which is shown in FIG. 4 after it has passed through a filter having a transmission characteristic according to FIG. 5.

FIG. 9 shows the spectral energy distribution which results after the light of the phosphor having the spectrum according to FIG. 4 has passed through a filter having the transmission characteristic according to FIG. 5. The x and y values associated with this filter-phosphor combination are 0.157 and 0.038. This is point E in FIG. 2b. The energy efficiency of this combination is larger than 6%.

Figure 10:
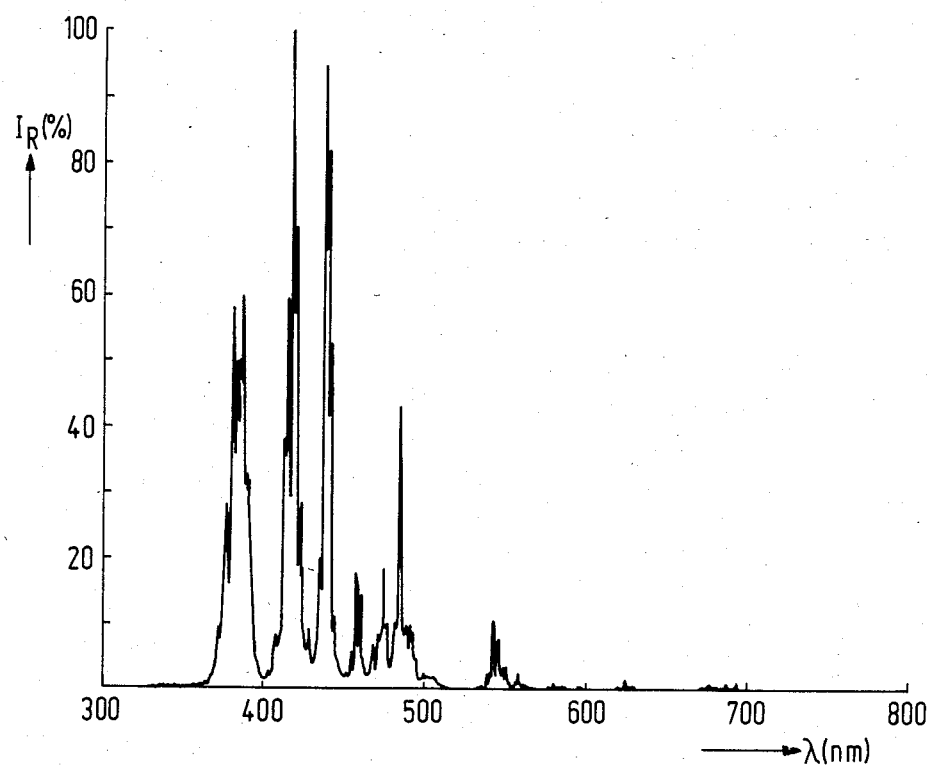
FIG. 10 shows a spectrum of the light of the phosphor the spectrum of which is shown in FIG. 4 after it has passed through a filter having a transmission characteristic according to FIG. 6.

FIG. 10 shows the spectral energy distribution which results after the light of the phosphor having the spectrum according to FIG. 4 has passed through a filter having the transmission characteristic according to FIG. 6. The x and y values associated with this filter-phosphor combination are 0.161 and 0.069, respectively.

The energy efficiency of this combination is larger than 6.5%.

From FIGS. 7 to 10 inclusive it follows that it is possible, by combining suitable terbium-activated phosphors with suitable filters, to display a highly saturated blue picture having a reasonable to good energy efficiency.

What is claimed is:

1. A display tube comprising in an evacuated envelope means to generate at least one electron beam which is focused on a display screen and describes a field thereon, which display screen comprises a terbium-activated phosphor on a carrier, and in which the light emitted by the phosphor falls through a filter, characterized in that the energy of the emissions of the phosphor which find their origin in the $^5D_3$-level of terbium, is at least 40% of the energy of the emissions of all terbium levels and the filter has a transmission of more than 75% at those wavelengths where the $^5D_3 \rightarrow {}^7F_5$ and the $^5D_3 \rightarrow {}^7F_4$ emissions of terbium are located and the filter has a transmission of less than 10% at those wavelengths where the $^5D_4 \rightarrow {}^7F_5$ and the $^5D_4 \rightarrow {}^7F_4$ and the $^5D_4 \rightarrow {}^7F_3$ emissions of terbium are located so that the color point of the filtered light is located in the range $x \leq 0.200$ and $y \leq 0.100$ in the CIE color triangle.

2. A display tube as claimed in claim 1, characterized in that the terbium-activated phosphor is a phosphor on the basis of LnOX, wherein Ln is one or more of the elements selected from the group consisting of gadolinium (Gd), lutetium (Lu), yttrium (Y) and lanthanum (La) and X is one or more of the elements selected from the group consisting of fluorine (F), chlorine (Cl), bromine (Br) and iodine (I).

3. A display tube as claimed in claim 2, characterized in that the terbium-activated phosphor is a phosphor on the basis of lanthanum oxybromide (LaOBr) and the terbium (Tb) concentration is between 0.07 and 2 mol% with respect to the lanthanum (La).

4. A display tube as claimed in claim 1, characterized in that the terbium-activated phosphor is a phosphor on the basis of yttrium oxysulphide ($Y_2O_2S$) and the terbium (Tb) concentration is between 0.05 and 1 mol% with respect to the yttrium (Y).

5. A display tube as claimed in claim 1, characterized in that the filter has a transmission of more than 75% for light having a wavelength between 410 and 420 nm and between 435 and 445 nm, the transmission of the filter decreases between 445 and 530 nm to smaller than 15% at 530 nm, and the filter has a transmission of less than 10% between 540 and 560 nm, between 580 and 600 nm and between 610 and 630 nm.

6. A display tube as claimed in claim 5, characterized in that the transmission of the filter decreases between 445 and 530 nm to smaller than 10% at 530 nm.

7. A display tube as claimed in claim 5, characterized in that the filter has a transmission of less than 5% between 540 and 560 nm.

8. A display tube as claimed in claim 1 characterized in that it is a projection television display tube.

* * * * *

UNITED STATES PATENT AND TRADEMARK OFFICE
CERTIFICATE OF CORRECTION

PATENT NO. : 4,604,550

DATED : August 5, 1986

INVENTOR(S) : JAN L. VAN KOESVELD ET AL

It is certified that error appears in the above-identified patent and that said Letters Patent is hereby corrected as shown below:

IN THE SPECIFICATION:

Column 1, line 46, "this said" should be --this, this--.

Signed and Sealed this

Thirteenth Day of January, 1987

*Attest:*

DONALD J. QUIGG

*Attesting Officer*     *Commissioner of Patents and Trademarks*